US011865517B2

(12) United States Patent
Seyler et al.

(10) Patent No.: US 11,865,517 B2
(45) Date of Patent: Jan. 9, 2024

(54) CATALYST FOR REDUCING AMMONIA EMISSIONS

(71) Applicant: UMICORE AG & CO. KG, Hanau-Wolfgang (DE)

(72) Inventors: Michael Seyler, Mainaschaff (DE); Massimo Colombo, Frankfurt am Main (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 103 days.

(21) Appl. No.: 17/402,918

(22) Filed: Aug. 16, 2021

(65) Prior Publication Data

US 2022/0055019 A1 Feb. 24, 2022

(30) Foreign Application Priority Data

Aug. 18, 2020 (EP) .................................... 20191556

(51) Int. Cl.
| | |
|---|---|
| *B01J 23/42* | (2006.01) |
| *B01J 21/04* | (2006.01) |
| *B01J 21/06* | (2006.01) |
| *B01J 29/72* | (2006.01) |
| *B01J 35/02* | (2006.01) |
| *B01J 37/02* | (2006.01) |
| *B01J 35/00* | (2006.01) |

(52) U.S. Cl.
CPC .............. *B01J 23/42* (2013.01); *B01J 21/04* (2013.01); *B01J 21/063* (2013.01); *B01J 29/723* (2013.01); *B01J 35/023* (2013.01); *B01J 37/0215* (2013.01)

(58) Field of Classification Search
None
See application file for complete search history.

(56) References Cited

U.S. PATENT DOCUMENTS

| | | | |
|---|---|---|---|
| 11,117,098 B2 * | 9/2021 | Li | ................... B01D 46/24492 |
| 2008/0292519 A1 | 11/2008 | Caudle et al. | |
| 2010/0111796 A1 | 5/2010 | Caudle et al. | |
| 2014/0157763 A1 | 6/2014 | Chandler et al. | |
| 2014/0178273 A1 | 6/2014 | Ratts et al. | |
| 2014/0212350 A1 | 7/2014 | Andersen et al. | |
| 2015/0037233 A1 | 2/2015 | Fedeyko et al. | |
| 2016/0339387 A1 | 11/2016 | Ikoma et al. | |
| 2016/0367975 A1 | 12/2016 | Lu et al. | |
| 2018/0264446 A1 * | 9/2018 | Burgess | ................ F01N 3/0222 |
| 2019/0283011 A1 | 9/2019 | Chen et al. | |

FOREIGN PATENT DOCUMENTS

| | | | |
|---|---|---|---|
| CN | 110075907 A | | 8/2019 |
| DE | 10 2016 1111 50 A1 | | 12/2016 |
| DE | 102016207484 | * | 11/2017 |
| JP | 2008136979 | * | 6/2008 |
| KR | 20170016400 | * | 2/2017 |
| WO | 2012132095 | * | 10/2012 |
| WO | 2016/205506 A1 | | 12/2016 |
| WO | 2017/195107 A2 | | 11/2017 |

OTHER PUBLICATIONS

EP Search Report, EP20191556.8 dated Feb. 2, 2021 (36 pages).

* cited by examiner

*Primary Examiner* — Sheng H Davis
(74) *Attorney, Agent, or Firm* — Smith, Gambrell & Russell, LLP

(57) ABSTRACT

The present invention relates to a catalyst comprising a carrier substrate of length L, coating A arranged as the first layer on the carrier and containing platinum on a metal oxide, and coating B applied as the second layer to coating A and containing a Cu-exchanged molecular sieve and no noble metal, wherein the total washcoat quantity of coating A is 40 g/l or more of washcoat in relation to the coated catalyst volume.

22 Claims, 2 Drawing Sheets

CATALYST FOR REDUCING AMMONIA EMISSIONS

TECHNICAL FIELD

The present invention relates to a catalyst for the oxidation of ammonia, which is used in exhaust gas aftertreatment systems, in particular in automotive engineering.

DESCRIPTION

Increasingly stringent requirements are imposed on cleaning the exhaust gases of motor vehicles. While particles can be removed by filtration, incompletely combusted hydrocarbons (HC), carbon monoxide (CO) and nitrogen oxides ($NO_x$) must be converted to water, carbon dioxide and nitrogen. This takes place via catalytically active solids, which are generally applied as a coating to carrier substrates.

In the case of lean-burn engines, the conversion of HC and CO via oxidation catalysts is possible, but the reduction of $NO_x$ to nitrogen is not. Either the use of $NO_x$ storage catalysts or the use of so-called SCR catalysts is required for selective catalytic reduction (SCR). While $NO_x$ storage catalysts have to be periodically regenerated, this is not required for SCR catalysts.

However, the use of SCR catalysts requires the addition of reducing agents. Common practice is the injection of an aqueous solution of urea into the exhaust gas system upstream of the SCR catalyst. At temperatures above 175° C., ammonia ($NH_3$) and $CO_2$ form by hydrolysis:

$$(NH_2)_2CO + H_2O \rightarrow 2NH_3 + CO_2$$

The ammonia formed in turn serves as a reducing agent for reducing the nitrogen oxides to nitrogen via the SCR catalyst:

$$xNH_3 + yNO_x(+O_2) \rightarrow \tfrac{1}{2}(x+y)N_2 + 3x/2 H_2O$$

The reaction proceeds particularly quickly at a ratio of $NO/NO_2 \approx 1$:

$$2NH_3 + NO + NO_2 \rightarrow 2N_2 + 3H_2O$$

In order to achieve the most complete possible conversion of the nitrogen oxides, the urea is slightly overdosed. This in turn leads to unconverted ammonia in the exhaust gas, which is undesirable due to its toxic effect and is the reason why ammonia emissions are increasingly limited in exhaust gas legislation.

For this reason, so-called ammonia slip catalysts (ASC) are used to convert unconverted ammonia via the SCR catalyst. The ammonia is oxidized to nitrogen:

$$4NH_3 + 3O_2 \rightarrow 2N_2 + 6H_2O$$

The catalyst components active for ammonia oxidation are referred to below as AMOX.

In comparison to palladium and rhodium catalysts, platinum catalysts exhibit the highest ammonia oxidation activity (Hansen T. K. (2017). Kgs. Lyngby: Technical Univ. of Denmark (DTU)).

For the AMOX component, the noble metal is applied to a metal oxide. Aluminum oxide ($Al_2O_3$) can be used as the carrier oxide, since it has excellent thermal stability, but titanium oxide ($TiO_2$) can also be used. The washcoat loading quantity is then adjusted by means of a metal oxide, which is admixed and may or may not be the same as the carrier oxide. The quantity of this dilution oxide is adjusted in such a way that a complete coating of the carrier substrate already takes place, but the loading is as thin as possible, in order to keep diffusion inhibition small. A washcoat loading of 25 g/l in relation to the catalyst volume is usually sufficient for this purpose.

However, conventional $Al_2O_3$-supported AMOX catalysts have insufficient selectivity for the oxidation to nitrogen ($N_2$). As undesired side reactions, oxidation of ammonia to $NO_x$ and $N_2O$ occurs. This is of course contra-productive for the reduction of the nitrogen oxide and also problematic due to its effect as greenhouse gas.

In order to increase selectivity, the above AMOX catalyst is also combined with SCR-active catalyst compositions (WO2016/205506 A1, US2008/292519 A1, US2014/212350 A1, US2014/0157763 A1, US2015/037233 A1). A Cu-exchanged zeolite is suitable for this purpose. These SCR-active compositions are generally applied as a second (top) layer to the AMOX catalyst layer. This combination allows the selectivity of the catalyst to $N_2$ to be increased by subsequent reduction of $NO_x$ and, as a whole, constitutes the ammonia slip catalyst (ASC).

However, the Cu diffuses partially into the AMOX catalyst over the service life of the ASC and leads to partial poisoning of the platinum, which in turn decreases the catalytic activity of the AMOX catalyst.

The object of the present invention is therefore to provide an ammonia slip catalyst that has a lower deactivation as a result of the poisoning of platinum with Cu than known ammonia slip catalysts of the prior art.

Surprisingly, it has been found that a larger quantity of dilution oxide in the AMOX layer counteracts the aging of the catalyst, so that with unchanged noble metal content, the catalytic activity increases with increasing washcoat loading. This is surprising, since increased diffusion inhibition can be expected as a result of a thicker layer, but more catalytic centers are not available when the noble metal content is unchanged. The catalytic activity should thus be decreased. The inventors assume that the poisoning of the platinum by copper is decreased by a greater quantity of dilution oxide in the AMOX layer.

The object is therefore achieved by an ammonia slip catalyst, the ammonia oxidation layer of which is designed in such a way that its catalytic properties are influenced less strongly by Cu input than in ammonia slip catalysts of the prior art.

Figure 1:
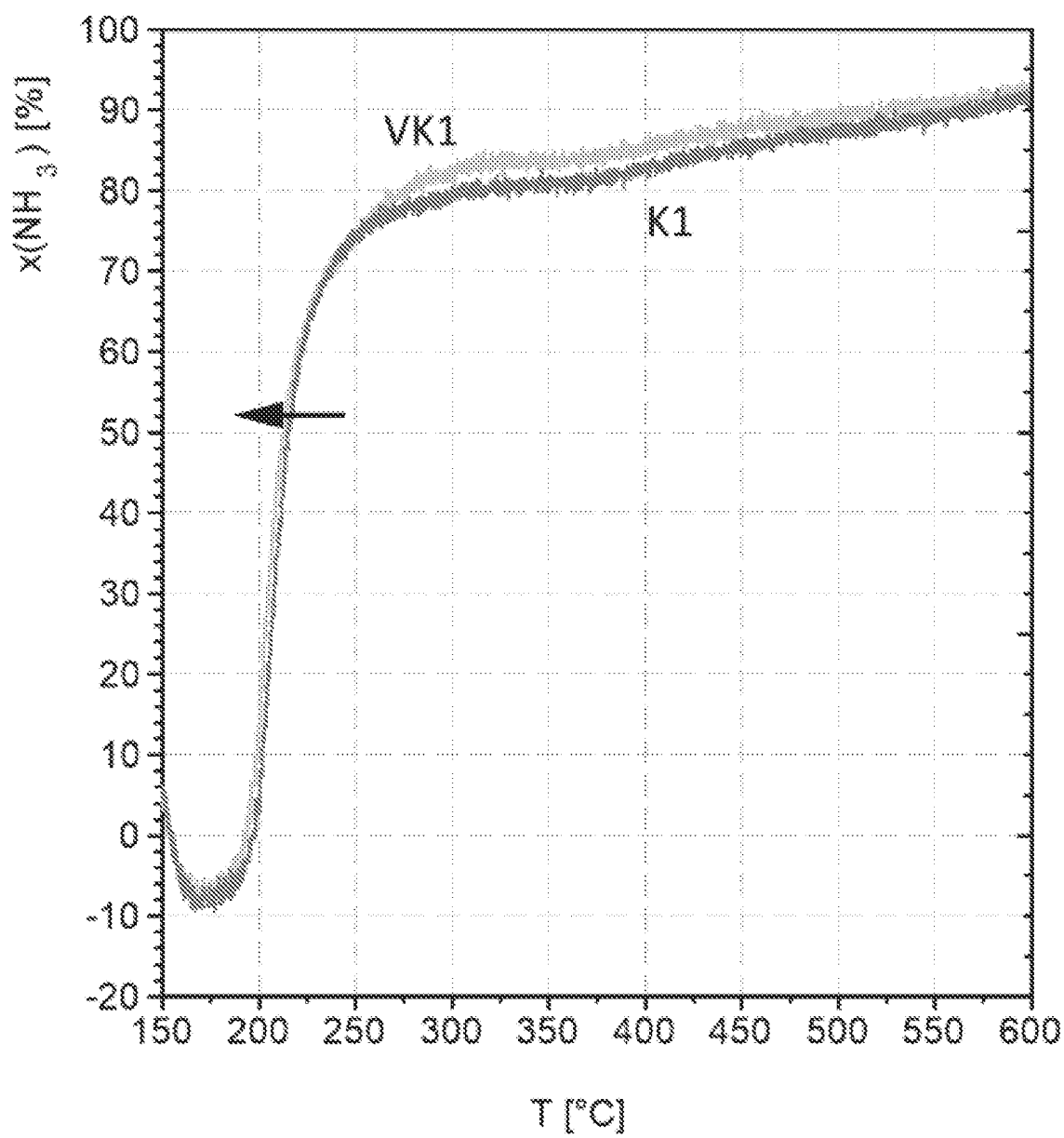
FIG. 1 shows the ammonia conversion as a function of temperature.

The invention is described in detail below.

The invention relates to a catalyst comprising
a carrier substrate of length L extending between an end X and an end Y,
coating A arranged as a first layer on the carrier and containing platinum on a metal oxide α and a metal oxide β that does not carry a noble metal, and
coating B applied as a second layer to coating A and containing a Cu-exchanged molecular sieve and no noble metal,
wherein the total washcoat quantity of coating A is 40 g/l or more of washcoat in relation to the coated catalyst volume.

Both flowthrough substrates and filter substrates may be used as carrier substrates for these catalysts. Flowthrough substrates are known to the person skilled in the art and are commercially available. They consist, for example, of cordierite, aluminum titanate or metal foil.

So-called corrugated substrates may also be used as flowthrough substrates. These are known to the person skilled in the art as substrates made of corrugated sheets consisting of inert materials. Suitable inert materials are, for example, fibrous materials having an average fiber diameter of 50 to 250 µm and an average fiber length of 2 to 30 mm. Fibrous, heat-resistant materials made of silicon dioxide, in particular glass fibers, are preferred.

For the production of such carrier substrates, sheets of the aforementioned fiber materials are, for example, corrugated in the known manner and the individual corrugated sheets are formed into a cylindrical monolithically structured body with channels running through the body. Preferably, a monolithically structured body with a crosswise corrugation structure is formed by stacking a number of the corrugated sheets into parallel layers with different orientation of the corrugation between the layers. In one embodiment, flat sheets can be arranged between the corrugated sheets.

Metal carrier substrates generally consist of structures made of corrugated metal sheets into which flat metal sheet layers can also be incorporated. These metal sheets are generally wound so that channel structures form, whose channels run in parallel and extend from one end of the substrate to the other end. The metal sheets can be continuous or provided with holes, in order to allow gas exchange between the channels. In addition, these metal sheet structures can be shaped in such a way that potential particle emissions are collected by the structure (so-called open filter substrates).

Carrier substrates can also be designed to be electrically heatable, in order to bring the catalyst to the desired operating temperature more quickly. In this case, either the coated carrier substrate itself is designed as an electrical resistor and heated by electric current flowing through it, or a similarly designed disk is arranged upstream of the coated carrier substrate in the exhaust gas stream, so that the exhaust gas is heated before flowing through the coated carrier substrate. Recently, the inductive heating of a catalyst has also been proposed, which is made possible by introducing particles of magnetic materials into the coating (WO2017/195107 A2).

A wall-flow filter is a carrier body comprising channels of length L, which extend in parallel between a first and a second end of the wall-flow filter, are alternately closed at either the first or the second end and are separated by porous walls. They consist, for example, of silicon carbide, aluminum titanate or cordierite. In an uncoated state, wall-flow filters have porosities of, for example, 30 to 80%, in particular 50 to 75%. In the uncoated state, their average pore size is 5 to 30 µm, for example.

Generally, the pores of the wall-flow filter are so-called open pores, i.e., they have a connection to the channels. Furthermore, the pores are generally interconnected with one another. This enables, on the one hand, easy coating of the inner pore surfaces and, on the other hand, easy passage of the exhaust gas through the porous walls of the wall-flow filter.

In a preferred embodiment, the carrier substrate is a flowthrough substrate.

In a preferred variant of the present invention, the total washcoat quantity of coating A is 50 g/l or more in relation to the coated catalyst volume. Preferably, a total washcoat quantity of 75 g/l or less in relation to the coated catalyst volume is selected for coating A, since a higher loading only slightly improves aging stability, but the material expenditure and thus the costs as well as the back-pressure increase are increased by the coating.

Particularly preferably, the total washcoat quantity for coating A is therefore 40 g/l to 75 g/l, more particularly preferably 50 g/l to 75 g/l, in relation to the coated catalyst volume.

Aluminum oxide, titanium oxide, cerium oxide, silicon oxide and/or zirconium oxide can in each case be used as metal oxide α or metal oxide β in coating A. It is known to the person skilled in the art that aluminum oxide can be stabilized by additives. A mixture of different metal oxides or one or more mixed oxides may also be used. In this invention, a mixture of metal oxides is to be understood to mean a material consisting of two or more physically mixed metal oxides. In this invention, a mixed oxide is to be understood to mean a material whose crystal lattice consists of oxygen and cations of two or more metals.

In one embodiment of the present invention, metal oxide α and metal oxide β are different. This makes it possible to select the ideal carrier oxide for platinum as metal oxide α, and at the same time, to use as metal oxide β a dilution oxide that best improves aging stability, since effects of different strengths were observed with different oxides. Titanium oxide thus exhibits good properties as carrier oxide (metal oxide α). Aluminum oxide exhibits good properties as dilution oxide (metal oxide β). The inventors assume that aluminum oxide particularly effectively inhibits Cu migration.

Preferably, metal oxide α is titanium oxide and metal oxide β is aluminum oxide.

In one embodiment variant, the catalyst contains no further noble metal other than platinum, i.e., in particular no palladium and no rhodium in addition to platinum.

Preferably, the platinum is present in coating A in the form of particles on the metal oxide α and has an average particle diameter of 50 to 200 nm, preferably 80 to 120 nm, averaged over the number of particles.

In this invention, the average particle diameter is the average diameter of the Pt crystallites, which is calculated from X-ray diffraction images on the basis of the [111] main reflex at approximately 39.8° 2Theta over the peak width (full width at half maximum, FWHM). Here, a silicon with a peak at 28.4° 2Theta and a FWHM of 0.06° 2Theta is used as standard.

The Cu-exchanged molecular sieve contained in coating B is preferably a Cu-exchanged zeolite.

Zeolites are two- or three-dimensional structures, the smallest substructures of which can be considered as $SiO_4$ and $AlO_4$ tetrahedra. They are therefore also referred to as "silicaaluminates." These tetrahedra form larger structures, wherein two are respectively connected to one another via a common oxygen atom. Differently sized ring structures, such as ring structures of 4, 6, or even nine tetrahedrally coordinated Si or Al atoms, can thus be formed. The various zeolite types are often defined by the largest ring size, since this size determines which guest molecules can penetrate the zeolite structure. Usually, a distinction is made between large-pore zeolites with a ring size of up to 12 tetrahedra, medium-pore zeolites with a ring size of up to 10 tetrahedra and small-pore zeolites with a ring size of up to 8 tetrahedra. The zeolites are divided by the Structural Commission of the International Zeolite Association into structure types, which are indicated by three-letter codes. Known small-pore zeolites are the structure types AEI, CHA (chabazite), ERI (erionite), LEV (levyne) and KFI. Examples of large-pore zeolites are those of the structure type faujasite (FAU).

Both large-pore and medium-pore or small-pore zeolites can be used for the catalyst according to the invention. Examples of suitable zeolites belong to the structure types ABW, AEI, AFX, BEA, CHA, DDR, ERI, ESV, FAU, FER, KFI, LEV, LTA, MER MFI, MWW, SOD or STT.

A small-pore zeolite of the structure type AEI, AFX, CHA or LEV is preferred. A zeolite of the structure type CHA is particularly preferred. The $SiO_2:Al_2O_3$ ratio (SAR) is preferably 2:100, particularly preferably 5:50, and further preferably 5:40.

For the present invention, the term "zeolite" is also to include non-zeolitic molecular sieves, which are occasionally referred to as zeolite-like structures. Molecular sieves of the aforementioned structure types are preferably used. Examples include silicon-aluminum-phosphate zeolites, which are also referred to as SAPO, and aluminum-phosphate zeolites, which are known as AlPO.

In this invention, the term "non-zeolitic molecular sieve" refers to a corner-joined lattice of tetrahedrally coordinated atoms, wherein at least a portion of the tetrahedral lattice positions are occupied by an atom other than silicon or aluminum. If the silicon atoms are partially replaced by aluminum atoms and phosphorus atoms, they are silica-aluminophosphates, also called SAPO. If all silicon atoms have been replaced by aluminum atoms and phosphorus atoms, they are aluminophosphates, also called AlPO.

A "zeotype" includes any materials based on a specific zeolite structure. Thus, a specific zeotype includes, for example, aluminosilicates, SAPOs and AlPOs that are based on a specific zeolite structure. Thus, both chabazite (CHA), aluminosilicates SSZ-13, silica-aluminophosphates SAPO-34 and aluminophosphate MeAlPO-47 all belong to the same zeotype. Zeolitic and non-zeolitic molecular sieves of the same zeotype are listed in the database of the International Zeolite Association (IZA). The person skilled in the art can use this knowledge and the IZA database without departing from the scope of protection of this invention.

The coating of the carrier substrate can be prepared according to methods familiar to the person skilled in the art, for example according to the common dip-coating method or pump-coating and suction-coating methods with subsequent thermal aftertreatment (calcination).

The coatings A and B preferably extend from end X to end Y of the carrier substrate. However, the coatings can also be applied only over 10% to 80% of the total length L of the carrier substrate, in order to enable the construction of a zoned catalyst.

The person skilled in the art knows that, in the case of wall-flow filters, their average pore size and the mean particle size of the materials to be coated can be matched to one another in such a way that the latter lie on the porous walls that separate the inlet and outlet channels of the wall-flow filter (on-wall coating). The mean particle size of the materials to be coated can however also be selected in such a way that they are located in the porous walls; i.e., that the inner pore surfaces are coated (in-wall coating). In this case, the mean particle size of the materials to be coated must be small enough to penetrate into the pores of the wall-flow filter.

The input channels can likewise be coated with an SCR-active coating, and the outlet channels can be coated with an ASC coating. In this case, zoning over the length of the substrate can additionally be used.

The present invention likewise comprises an exhaust gas cleaning system comprising a catalyst according to the invention and an SCR catalyst. The latter is connected upstream of the catalyst according to the invention in the exhaust gas stream. In this case, the SCR can be installed together with the catalyst according to the invention in one housing or can also be arranged in a separate housing. In the former case, the SCR can still be heated by radiation heat in the case of a small exhaust gas stream and a small distance; in the latter case, the SCR and the ASC can be arranged more flexibly in the vehicle.

The SCR catalyst arranged upstream of the ASC in the exhaust gas stream can in principle be selected from all catalysts active in the SCR reaction of nitrogen oxides with ammonia, in particular from those known as customary to the person skilled in the art in the field of automotive exhaust gas catalysis. This includes catalysts of the mixed-oxide type along with catalysts based on zeolites, in particular transition-metal-exchanged zeolites.

The invention is described in more detail with reference to examples:

Example 1—Catalyst K1 According to the Invention

Coating A: Platinum was applied to titanium oxide by the incipient wetness method. The obtained powder was dried and calcined. The dried powder contains 7% by weight platinum and is referred to below as $Pt/TiO_2$. Thereafter, an aqueous boehmite sol was prepared, and titanium oxide ($TiO_2$) was added thereto. $Pt/TiO_2$ was added to this dispersion. The dry fractions were then 3% by weight $Pt/TiO_2$, 87% by weight $TiO_2$ and 10% by weight $Al_2O_3$. With the washcoat thus prepared, a commercially available catalyst substrate made of cordierite having the cell density of 62 cells/cm$^2$ and the wall thickness of 110 μm was coated so that the Pt loading was 1.07 g/l in relation to the catalyst volume. The resulting washcoat loading was 50 g/l in relation to the catalyst volume.

Coating B: A powder of a Cu-exchanged zeolite of the CHA type was stirred into an aqueous boehmite sol. With the washcoat thus prepared, the catalyst substrate provided with coating A was coated with a loading of 150 g/l in relation to the catalyst volume, dried, and calcined at 500° C.

Example 2—Catalyst K2 According to the Invention

Coating A: Platinum was applied to titanium oxide by the incipient wetness method. The obtained powder was dried and calcined. The dried powder contains 7% by weight platinum and is referred to below as $Pt/TiO_2$. Thereafter, an aqueous boehmite sol was prepared, and titanium oxide ($TiO_2$) was added thereto. $Pt/TiO_2$ was added to this dispersion. The dry fractions were then 2% by weight $Pt/TiO_2$, 88% by weight $TiO_2$ and 10% by weight $Al_2O_3$. With the washcoat thus prepared, a commercially available catalyst substrate made of cordierite having the cell density of 62 cells/cm$^2$ and the wall thickness of 110 μm was coated so that the Pt loading was 1.07 g/l in relation to the catalyst volume. The resulting washcoat loading was 75 g/l in relation to the catalyst volume.

Coating B: A powder of a Cu-exchanged zeolite of the CHA type was stirred into a boehmite sol. With the washcoat thus prepared, the catalyst substrate provided with coating A was coated with a loading of 150 g/l in relation to the catalyst volume, dried, and calcined at 500° C.

Example 3—Comparison Catalyst VK1

Coating A: Platinum was applied to titanium oxide by the incipient wetness method. The obtained powder was dried and calcined. The dried powder contains 7% by weight platinum and is referred to below as $Pt/TiO_2$. Thereafter, an aqueous boehmite sol was prepared, and titanium oxide (TiO$_2$) was added thereto. Pt/TiO$_2$ was added to this dispersion. The dry fractions were then 6% by weight Pt/TiO$_2$, 84% by weight TiO$_2$ and 10% by weight Al$_2$O$_3$. With the washcoat thus prepared, a commercially available catalyst substrate made of cordierite having the cell density of 62 cells/cm$^2$ and the wall thickness of 110 μm was coated so that the Pt loading was 1.07 g/l in relation to the catalyst volume. The resulting washcoat loading was 25 g/l in relation to the catalyst volume.

Coating B: A powder of a Cu-exchanged zeolite of the CHA type was stirred into a boehmite sol. With the washcoat thus prepared, the catalyst substrate provided with coating A was coated with a loading of 150 g/l in relation to the catalyst volume, dried, and calcined at 500° C.

Testing

First, a drill core having dimensions 1"×3" was taken from each of the 3 catalysts K1, K2 and VK1. The catalytic activity was determined in a model gas system with 300 ppm NH$_3$, 5% O$_2$ and 5% H$_2$O, remainder: N$_2$, wherein the temperature was raised from 150° C. to 600° C. at 10° C./min. The space velocity was 200000 h$^{-1}$.

The activity in the fresh state was checked on the basis of K1 and VK1. FIG. 1 shows the ammonia conversion as a function of temperature. As can be seen, the catalytic activity of K1 and VK1 for ammonia oxidation is almost identical.

The drill cores of K1, K2 and VK1 were subsequently hydrothermally aged for 16 hours at 750° C. in 10% H$_2$O and 10% O$_2$ (remainder: N$_2$).

Figure 2:
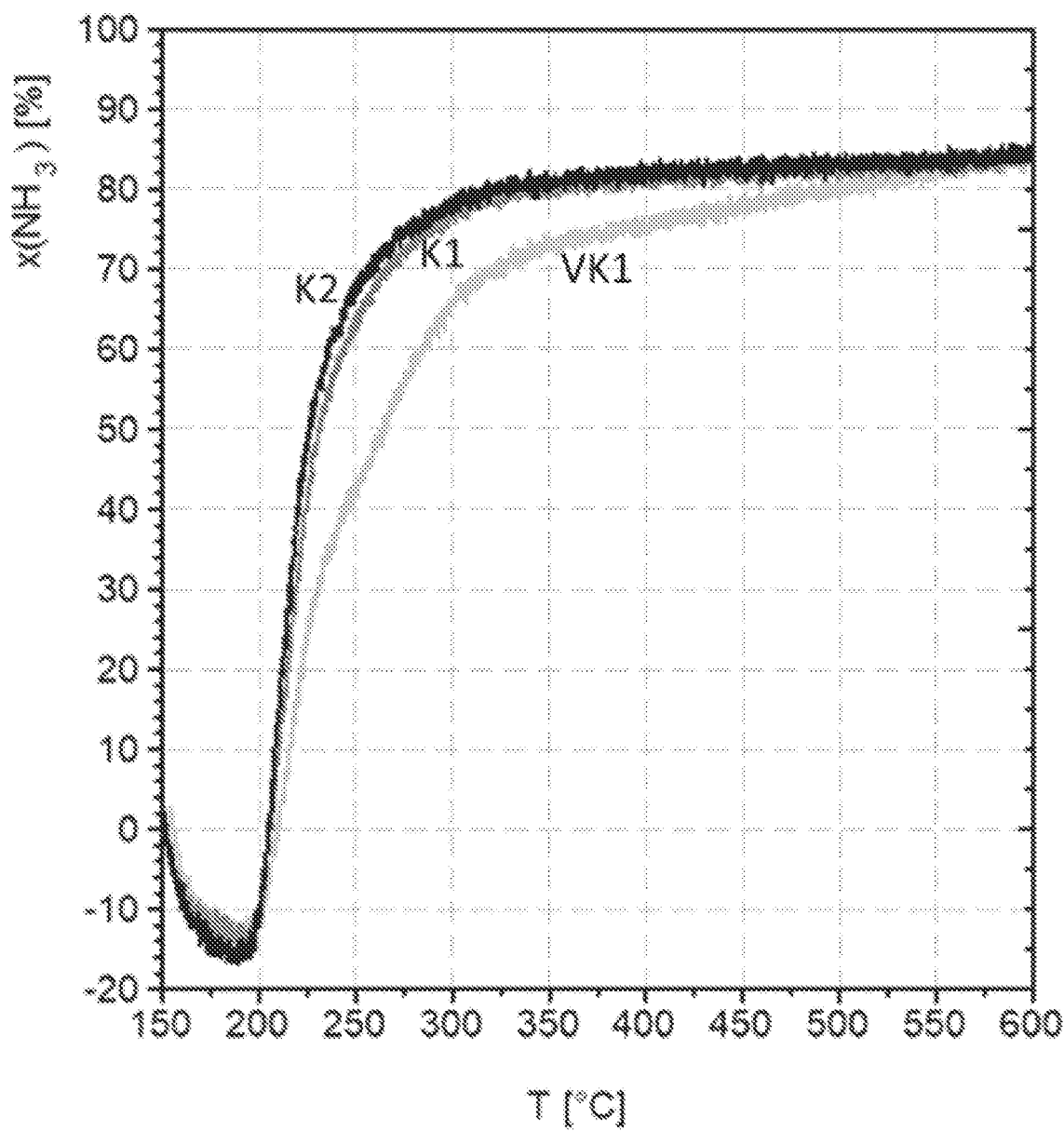
FIG. 2 shows the ammonia conversion as a function of the temperature for the catalysts in the aged state.

FIG. 2 shows the ammonia conversion as a function of the temperature for the catalysts in the aged state. The catalysts K1 and K2 according to the invention have significantly higher NH$_3$ conversions between 200 and 550° C. than the comparison catalyst VK1, although their platinum content is the same as that of the comparison catalyst VK1. An increase in the washcoat loading of the first layer to 50 g/l in relation to the catalyst volume thus significantly improves aging stability.

The results for the aged catalysts are compiled in Table 1.

It is also interesting here that the NH$_3$ conversions could not be significantly increased by further increasing the washcoat loading of the first layer from 50 g/l to 75 g/l in relation to the catalyst volume, the NH$_3$ conversion via K1 and K2 is almost the same. Thus, a further increase in washcoat loading of the first layer leads to higher material requirements and thus to increased costs as well as to an increase in the back pressure caused by the catalyst, without bringing significant advantages.

TABLE 1

|  | K1 | K2 | VK1 |
| --- | --- | --- | --- |
| Washcoat loading of the lower layer | 50 g/l | 75 g/l | 25 g/l |
| T$_{50}$ (NH$_3$) [° C.] | 230 | 225 | 267 |

The invention claimed is:

1. A catalyst comprising
   a carrier substrate of length L extending between an end X and an end Y,
   coating A arranged as a first layer on the carrier and containing platinum on a metal oxide α and a metal oxide β that does not carry a noble metal, and
   coating B applied as a second layer to coating A and containing a Cu-exchanged molecular sieve and no noble metal,
   wherein a total washcoat quantity of coating A is 40 g/l to 75 g/l based on coated catalyst volume.

2. The catalyst according to claim 1, characterized in that the total washcoat quantity of coating A is 50 g/l to 75 g/l based on the coated catalyst volume.

3. The catalyst according to claim 1, characterized in that the carrier substrate is a flowthrough substrate.

4. The catalyst according to claim 1, characterized in that metal oxide α and metal oxide β are different.

5. The catalyst according to claim 1, characterized in that metal oxide α is titanium oxide.

6. The catalyst according to claim 1, characterized in that metal oxide β is aluminum oxide.

7. The catalyst according to claim 1, characterized in that metal oxide α is titanium oxide and metal oxide β is aluminum oxide.

8. The catalyst according to claim 1, characterized in that the catalyst does not contain any noble metal other than platinum.

9. The catalyst according to claim 1, characterized in that, the platinum in coating A is present in the form of particles on the metal oxide α and has an average particle size of 50 to 200 nm averaged over the number of particles.

10. The catalyst according to claim 9, characterized in that, the platinum in coating A is present in the form of particles on the metal oxide α having an average particle size of 80 to 120 nm averaged over the number of particles.

11. The catalyst according to claim 1, characterized in that the Cu-exchanged molecular sieve contained in coating B is a Cu-exchanged zeolite.

12. The catalyst according to claim 1, characterized in that the Cu-exchanged molecular sieve in coating B is a Cu-exchanged zeolite of the type AEI, AFX, CHA or LEV.

13. The catalyst according to claim 1, characterized in that the Cu-exchanged molecular sieve in coating B is a Cu-exchanged zeolite of the type CHA.

14. A catalyst comprising
   a carrier substrate of length L extending between an end X and an end Y,
   coating A arranged as a first layer on the carrier and containing platinum on a metal oxide α and a metal oxide β that does not carry a noble metal, and wherein metal oxide α and metal oxide β are different and intermingled throughout the full thickness of the first layer;
   coating B applied as a second layer to coating A and containing a Cu-exchanged molecular sieve and no noble metal,
   wherein total washcoat quantity of coating A is 40 g/l to 75 g/l based on coated catalyst volume.

15. The catalyst of claim 14, wherein the total washcoat quantity of coating A is 50 g/l to 75 g/l based on coated catalyst volume.

16. The catalyst of claim 14, wherein metal oxide β, which does not carry a noble metal, is provided in the first layer as dilution metal oxide (MO2D); whereas metal oxide α is provided in the first layer as both the Pt containing metal oxide (MO1P) as well as another dilution metal oxide that is noble metal free (MO1D).

17. The catalyst of claim 16, wherein MO1D>MO2D>MO1P in terms of relative weight percentage.

18. The catalyst of claim 17, wherein metal oxide α is TiO2 and metal oxide β is Al2O3.

19. The catalyst of claim 14, wherein coating A extends at or greater than 80% of L.

20. The catalyst of claim 14, wherein the carrier substrate is a flowthough carrier substrate.

21. The catalyst of claim 14, wherein the only coatings supported on the carrier substrate are coatings A and B, with coating A having a common composition over a full length of extension on the carrier substrate, and coating B having a common composition over a full length of extension on the carrier substrate.

22. An exhaust gas cleaning system, comprising the catalyst according to claim 1 and an SCR catalyst.

* * * * *